(12) United States Patent
Crawford et al.

(10) Patent No.: US 9,946,617 B2
(45) Date of Patent: Apr. 17, 2018

(54) OPTIMIZED RECOVERY IN DATA REPLICATION ENVIRONMENTS

(71) Applicant: International Business Machines Corporation, Armonk, NY (US)

(72) Inventors: Joshua J. Crawford, Tucson, AZ (US);
Paul A. Jennas, II, Tucson, AZ (US);
Jason L. Peipelman, Austin, TX (US);
Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 15/174,742

(22) Filed: Jun. 6, 2016

(65) Prior Publication Data

US 2017/0351591 A1 Dec. 7, 2017

(51) Int. Cl.
| | | |
|---|---|---|
| G06F 11/00 | (2006.01) | |
| G06F 11/20 | (2006.01) | |
| G06F 3/06 | (2006.01) | |

(52) U.S. Cl.
CPC ......... *G06F 11/2094* (2013.01); *G06F 3/065* (2013.01); *G06F 3/0611* (2013.01); *G06F 3/0619* (2013.01); *G06F 3/0683* (2013.01); *G06F 2201/805* (2013.01)

(58) Field of Classification Search
CPC ............ G06F 11/1458; G06F 11/1469; G06F 11/2094; G06F 3/0611; G06F 3/065; G06F 3/0683

See application file for complete search history.

(56) References Cited

U.S. PATENT DOCUMENTS

| 7,778,976 B2 | 8/2010 | D'Souza et al. |
| 8,560,886 B1 | 10/2013 | Kekre et al. |
| 2002/0194442 A1 | 12/2002 | Yanai et al. |

(Continued)

FOREIGN PATENT DOCUMENTS

| WO | WO2008028803 A2 | 3/2008 |
| WO | WO2008084007 A1 | 7/2008 |
| WO | WO2014170810 A1 | 10/2014 |

OTHER PUBLICATIONS

Brooks, Charlotte, et al., "IBM System Storage Business Continuity: Part 2 Solutions Guide," IBM Redbook, Feb. 4, 2007.

(Continued)

*Primary Examiner* — Michael Maskulinski
(74) *Attorney, Agent, or Firm* — Nelson and Nelson; Daniel P. Nelson; Alexis V. Nelson (57) ABSTRACT

A method for optimizing recovery in a data replication environment is disclosed. In one embodiment, such a method includes directing I/O from a primary site to a secondary site in response to a failure at the primary site. After the primary site has recovered from the failure, the method initiates a recovery process wherein updated data elements at the secondary site are copied to the primary site. The method determines a recorded average I/O latency for a host system driving I/O to the secondary site, and calculates an expected average I/O latency for the host system driving I/O to the primary site. The method redirects I/O from the secondary site to the primary site when a difference between the expected average I/O latency and the recorded average I/O latency reaches a threshold value. A corresponding system and computer program product are also disclosed.

20 Claims, 11 Drawing Sheets

(56) References Cited

U.S. PATENT DOCUMENTS

| | | |
|---|---|---|
| 2006/0259721 A1 | 11/2006 | Ohran |
| 2009/0217085 A1* | 8/2009 | Van Riel ............. G06F 11/1466 714/6.12 |
| 2009/0249116 A1 | 10/2009 | Bartfai et al. |
| 2010/0257142 A1* | 10/2010 | Murphy ............. G06F 11/1453 707/681 |
| 2010/0274983 A1* | 10/2010 | Murphy ............. G06F 11/1456 711/162 |
| 2010/0275055 A1 | 10/2010 | Edel et al. |
| 2010/0325500 A1 | 12/2010 | Bashir et al. |
| 2011/0264877 A1* | 10/2011 | Amano ................ G06F 3/0613 711/162 |
| 2013/0110778 A1* | 5/2013 | Taylor ............... G06F 17/30215 707/624 |
| 2013/0204960 A1* | 8/2013 | Ashok .................... G06F 15/17 709/213 |
| 2013/0311719 A1 | 11/2013 | Doedline, Jr. et al. |

OTHER PUBLICATIONS

Jianfeng, Zhu, et al., "A Duplicate-Aware Data Replication", Japan-China Joint Workshop on Frontier of Computer Science and Technology, IEEE, Dec. 2008.

List of IBM Patents or Patent Applications Treated as Related.

\* cited by examiner

OPTIMIZED RECOVERY IN DATA REPLICATION ENVIRONMENTS

BACKGROUND

Field of the Invention

This invention relates to systems and methods for optimizing recovery in data replication environments.

Background of the Invention

In data replication environments such as Peer-to-Peer-Remote-Copy ("PPRC") or Extended Remote Copy ("XRC") environments, data is mirrored from a primary storage device to a secondary storage device to maintain two consistent copies of the data. The primary and secondary storage devices may be located at different sites, perhaps hundreds or even thousands of miles away from one another. In the event an outage occurs at the primary site, I/O may be redirected to the secondary storage device, thereby enabling continuous operations. This process may be referred to as a "failover." When the outage is corrected or repaired at the primary site, I/O may be redirected back to the primary storage device. This process may be referred to as a "failback."

After a failover occurs, updates may occur to data stored on the secondary storage device. These updates may not be propagated to the primary storage device due to the outage at the primary site. After the outage is corrected or repaired at the primary site, these updates may be mirrored back to the primary storage device before production can resume to the primary storage device. This process of mirroring updates back to the primary storage device can be a very time-consuming process, taking on the order of hours or even days, depending on the length of the outage and/or how much data was written to the secondary storage device during the outage. During this time period, production typically cannot be resumed at the primary site.

In view of the foregoing, systems and methods are needed to accelerate recovery in data replication environments. In particular, systems and methods are needed to more quickly resume production at a primary site after an outage at the primary site has been corrected. Further needed are systems and methods to reduce an amount of bandwidth needed to resynchronize a primary storage device with a secondary storage device after an outage has been corrected.

SUMMARY

The invention has been developed in response to the present state of the art and, in particular, in response to the problems and needs in the art that have not yet been fully solved by currently available systems and methods. Accordingly, the invention has been developed to provide systems and methods to optimize recovery in data replication environments. The features and advantages of the invention will become more fully apparent from the following description and appended claims, or may be learned by practice of the invention as set forth hereinafter.

Consistent with the foregoing, a method for optimizing recovery in a data replication environment is disclosed herein. In one embodiment, such a method includes directing I/O from a primary site to a secondary site in response to a failure at the primary site. After the primary site has recovered from the failure, the method initiates a recovery process wherein updated data elements at the secondary site are copied to the primary site. The method determines a recorded average I/O latency for a host system driving I/O to the secondary site, and calculates an expected average I/O latency for the host system driving I/O to the primary site. The method redirects I/O from the secondary site to the primary site when a difference between the expected average I/O latency and the recorded average I/O latency reaches a threshold value.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

Figure 1:
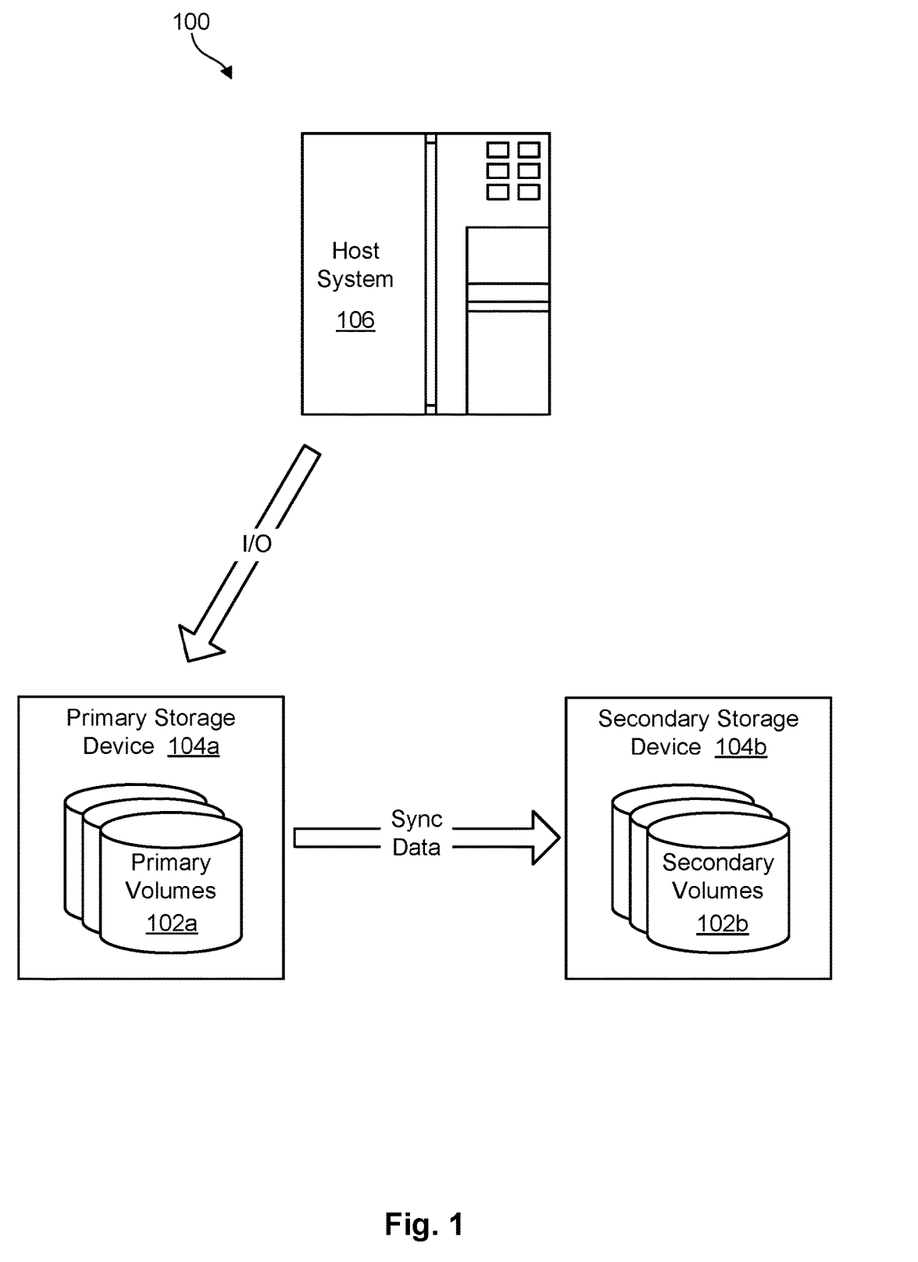
FIG. 1 is a high-level block diagram showing one example of a data replication environment during normal operation.

Referring to FIG. 1, one example of a data replication system 100, in this embodiment a Peer-to-Peer-Remote-Copy ("PPRC") or Extended Remote Copy ("XRC") system 100, is illustrated. The data replication system 100 is presented to show an example of an architecture in which embodiments of the invention may operate, and is not intended to be limiting. In general, the data replication system 100 establishes a mirroring relationship between one or more primary volumes 102a and one or more secondary volumes 102b. Once this relationship is established, a consistent copy of data is maintained on the volumes 102a, 102b. The primary and secondary volumes 102a, 102b may be located on the same storage device 104, although the volumes 102a, 102b are typically located on separate storage devices 104a, 104b located some distance (e.g., several miles to thousands of miles) from one another. Channel extension equipment may be located between the storage devices 104a, 104b, as needed, to extend the distance over which the storage devices 104a, 104b may communicate.

The data replication system 100 may, in certain embodiments, be configured to operate in either a synchronous or asynchronous manner. When operating synchronously, an I/O may only be considered complete when it has completed successfully on both the primary and secondary storage devices 104a, 104b. As an example, in such a configuration, a host system 106 may initially send a write request to the primary storage device 104a. This write operation may be performed on the primary storage device 104a. The primary storage device 104a may, in turn, transmit a write request to the secondary storage device 104b. The secondary storage device 104b may execute the write operation and return a write acknowledge signal to the primary storage device 104a. Once the write has been performed on both the primary and secondary storage devices 104a, 104b, the primary storage device 104a returns a write acknowledge signal to the host system 106. The I/O is only considered complete when the host 106 receives the write acknowledge signal.

By contrast, asynchronous operation may only require that the write complete on the primary storage device 104a before the write is considered complete. That is, a write acknowledgement may be returned to the host system 106 when the write has completed on the primary storage device 104a, without requiring that the write also be completed on the secondary storage device 104b. The write may then be mirrored to the secondary storage device 104b as time and resources allow to create a consistent copy on the secondary storage device 104b.

Figure 2:
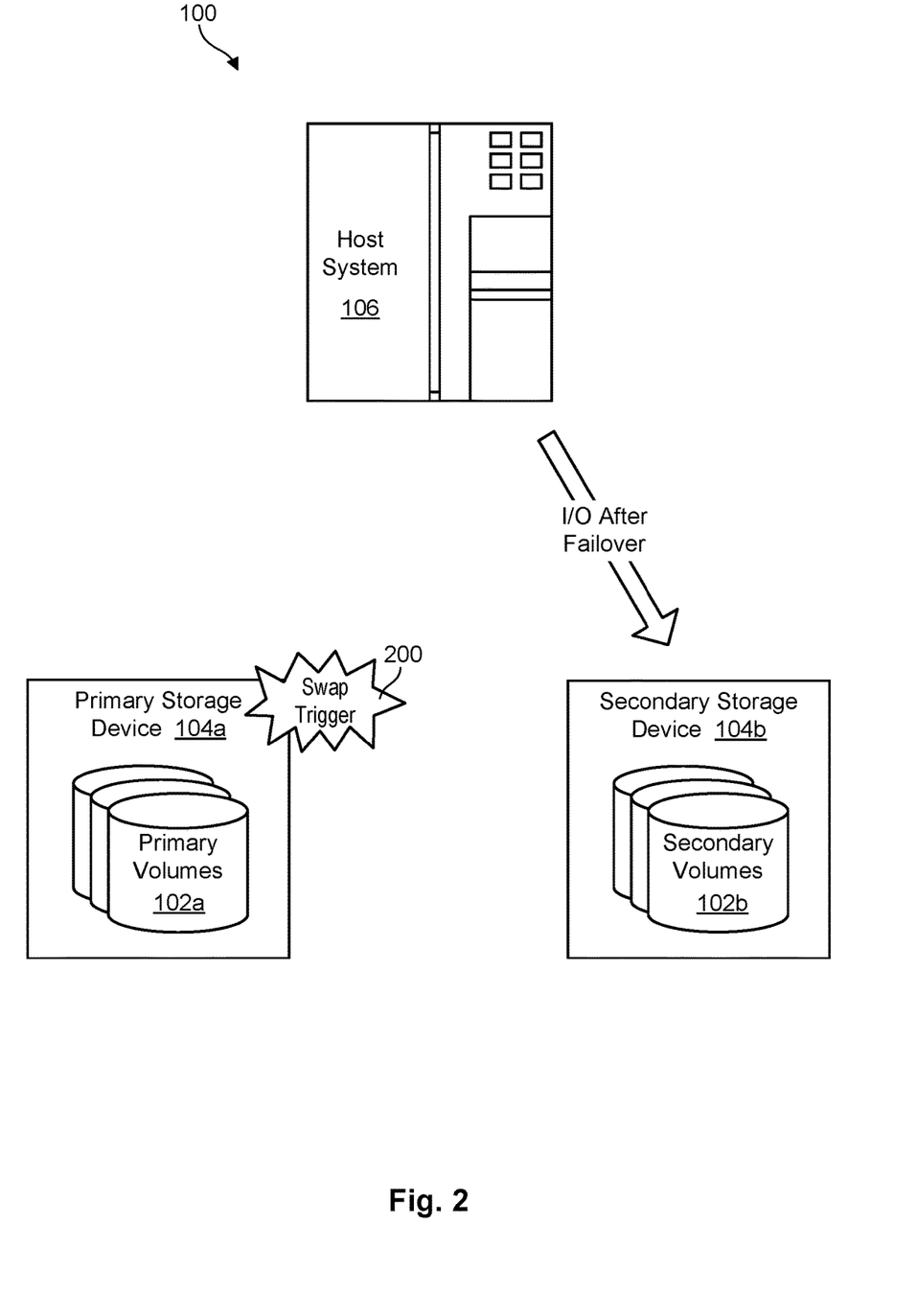
FIG. 2 is a high-level block diagram showing the data replication environment of FIG. 1 after a failover has occurred.

Referring to FIG. 2, in the event the primary storage device 104a or other functionality at the primary site fails or suffers an outage, I/O may be redirected to the secondary storage device 104b to enable continuous operations. This process may be referred to as a failover. Any event or outage which initiates a failover may be referred to as a swap trigger 200. Since the secondary storage device 104b contains a consistent copy of the data on the primary storage device 104a, the redirected I/O (e.g., reads and writes) may be performed on the copy of the data on the secondary storage device 104b. After a failover occurs, updates may occur to data stored on the secondary storage device 104b. These updates may not be propagated to the primary storage device 104a due to the outage at the primary site.

Figure 3:
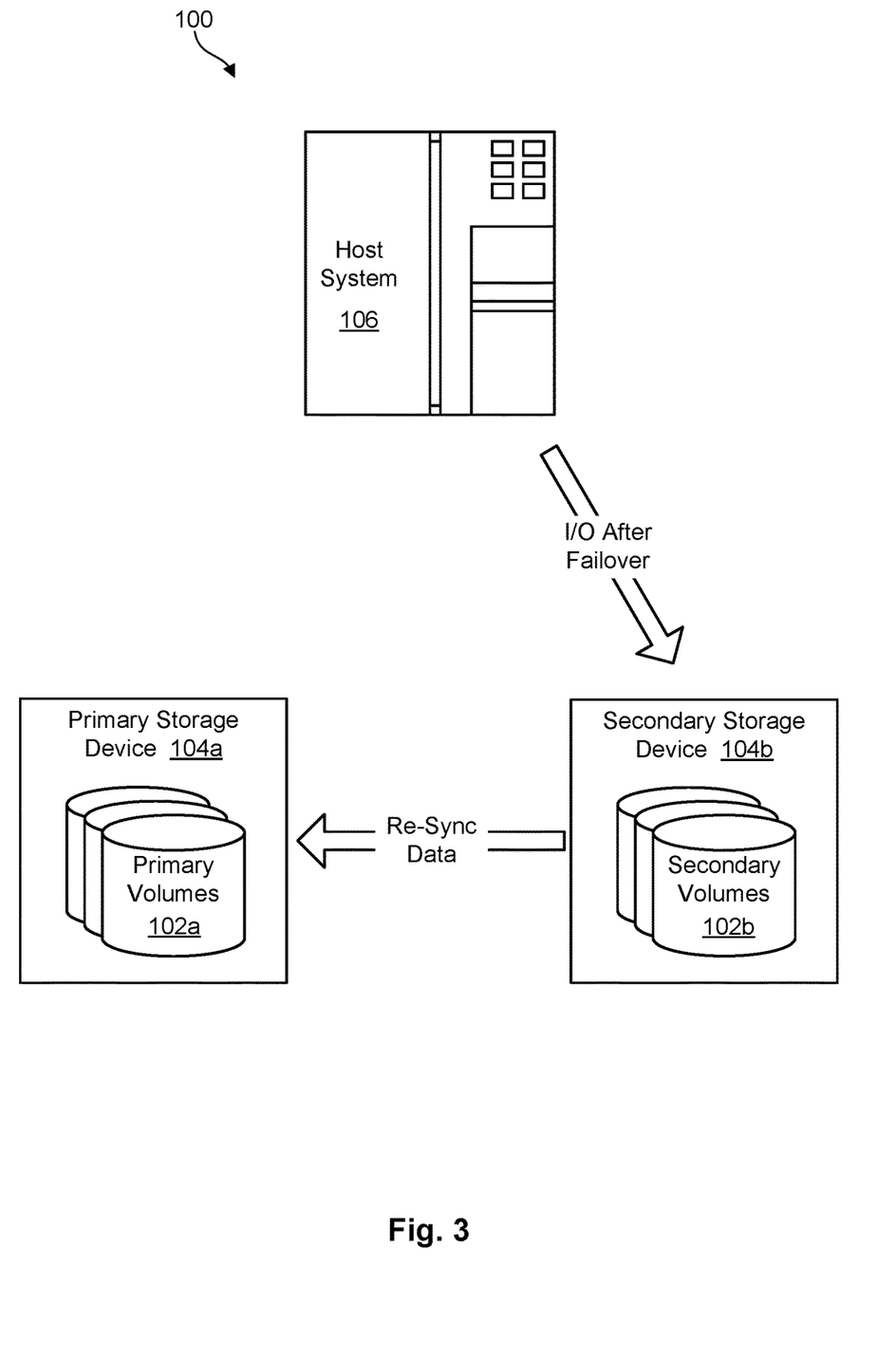
FIG. 3 is a high-level block diagram showing the data replication environment of FIG. 1 after an outage at the primary site has been corrected.

Referring to FIG. 3, after the outage is corrected or repaired at the primary site, the updates that were made to the secondary storage device 104b may be mirrored back to the primary storage device 104a before production can resume to the primary storage device 104a. This process of mirroring updates back to the primary storage device 104a can be a very time-consuming process, taking on the order of hours or even days, depending on the length of the outage and/or how much data was written to the secondary storage device 104b during the outage. During this time period, production typically cannot be resumed at the primary site. When all updates to the secondary storage device 104b are successfully mirrored to the primary storage device 104a, production may be restarted at the primary site. This will ideally allow the data replication system 100 to return to normal operation as illustrated in FIG. 1.

Referring generally to FIGS. 4 through 8, an improved technique is shown to accelerate recovery in a data replication system 100 after a failover has occurred and the outage has been corrected. Once an outage at the primary site has been corrected, the improved technique enables production at the primary site to be quickly resumed. This technique also advantageously reduces an amount of bandwidth needed to resynchronize a primary storage device with a secondary storage device.

Figure 4:
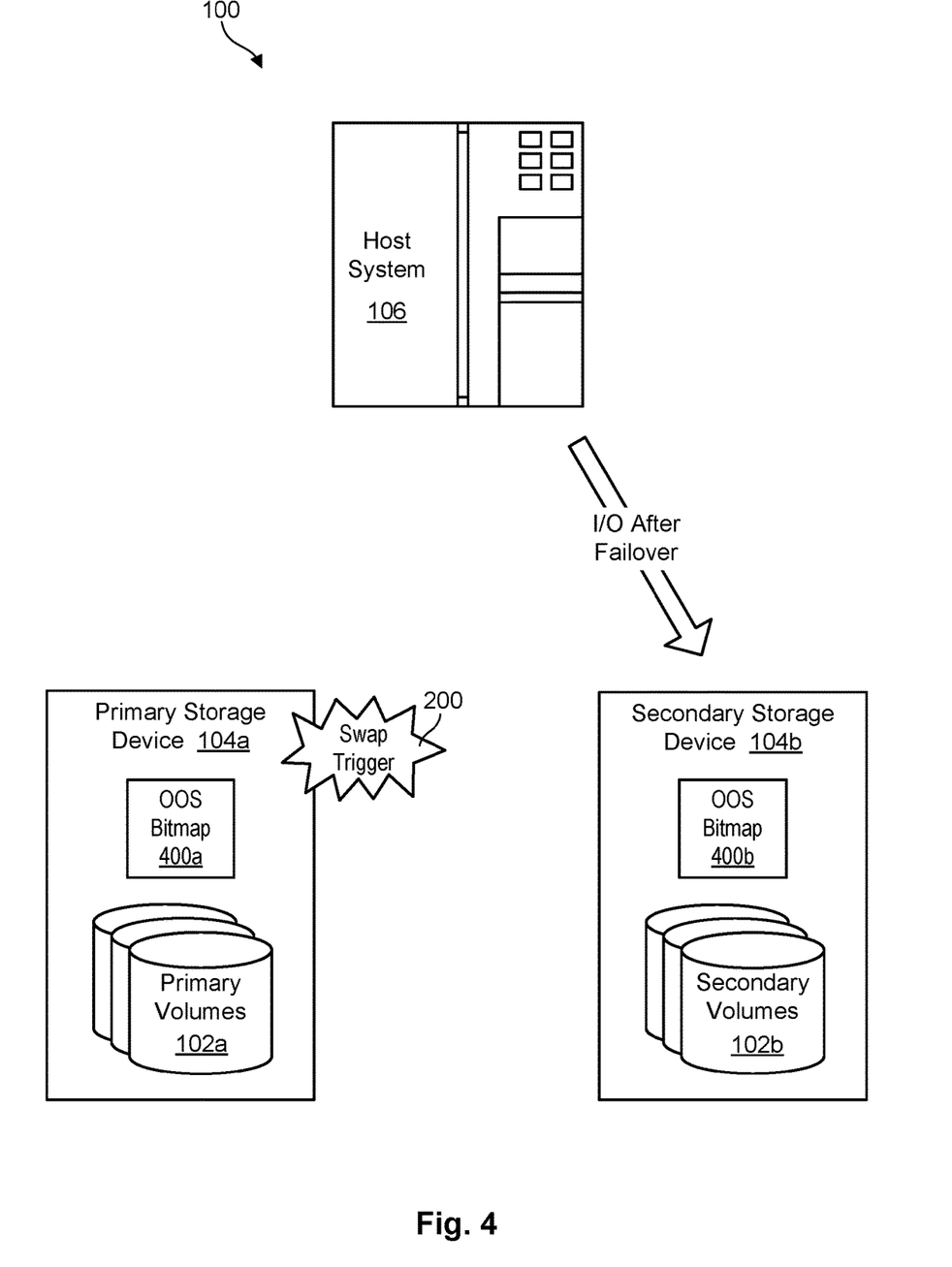
FIG. 4 is a high-level block diagram showing use of out-of sync bitmaps at the primary site and secondary site after a failover has occurred.

Referring to FIG. 4, in order to accelerate recovery in a data replication system 100, an improved system and method in accordance with the invention may utilize out-of-sync bitmaps 400 on the primary and secondary storage devices 104a, 104b. For the purposes of this disclosure, the out-of-sync bitmap 400 on the primary storage device 104a will be referred to as the primary out-of-sync bitmap 400a, and the out-of sync bitmap 400 on the secondary storage device 104b will be referred to as the secondary out-of-sync bitmap 400b. The primary out-of-sync bitmap 400a may be used to keep track of storage elements (e.g., tracks) that have been updated on the primary storage device 104a but not yet replicated to the secondary storage device 104b. Similarly, the secondary out-of-sync bitmap may be used to keep track of storage elements that have been updated on the secondary storage device 104b but not yet replicated to the primary storage device 104a. The primary out-of-sync bitmap 400a and secondary out-of-sync bitmap 400b may include a bit for each storage element on the primary volume 102a and secondary volume 102b respectively. In certain embodiments, an out-of sync bitmap 400 may be maintained for each volume on the primary storage device 104a and secondary storage device 104b. In other embodiments, an out-of sync bitmap 400 may be provided for multiple volumes.

When a failover occurs, as shown in FIG. 4, updates may be made to the secondary volume 102b that are not replicated to the corresponding primary volume 102a (since the primary volume 102a has experienced an outage). When updates are made to storage elements of the secondary volume 102b, the corresponding bits may be set in the secondary out-of-sync bitmap 400b to keep track of which storage elements need to be copied over to the primary volume 102a if and when the outage is corrected.

Figure 5:
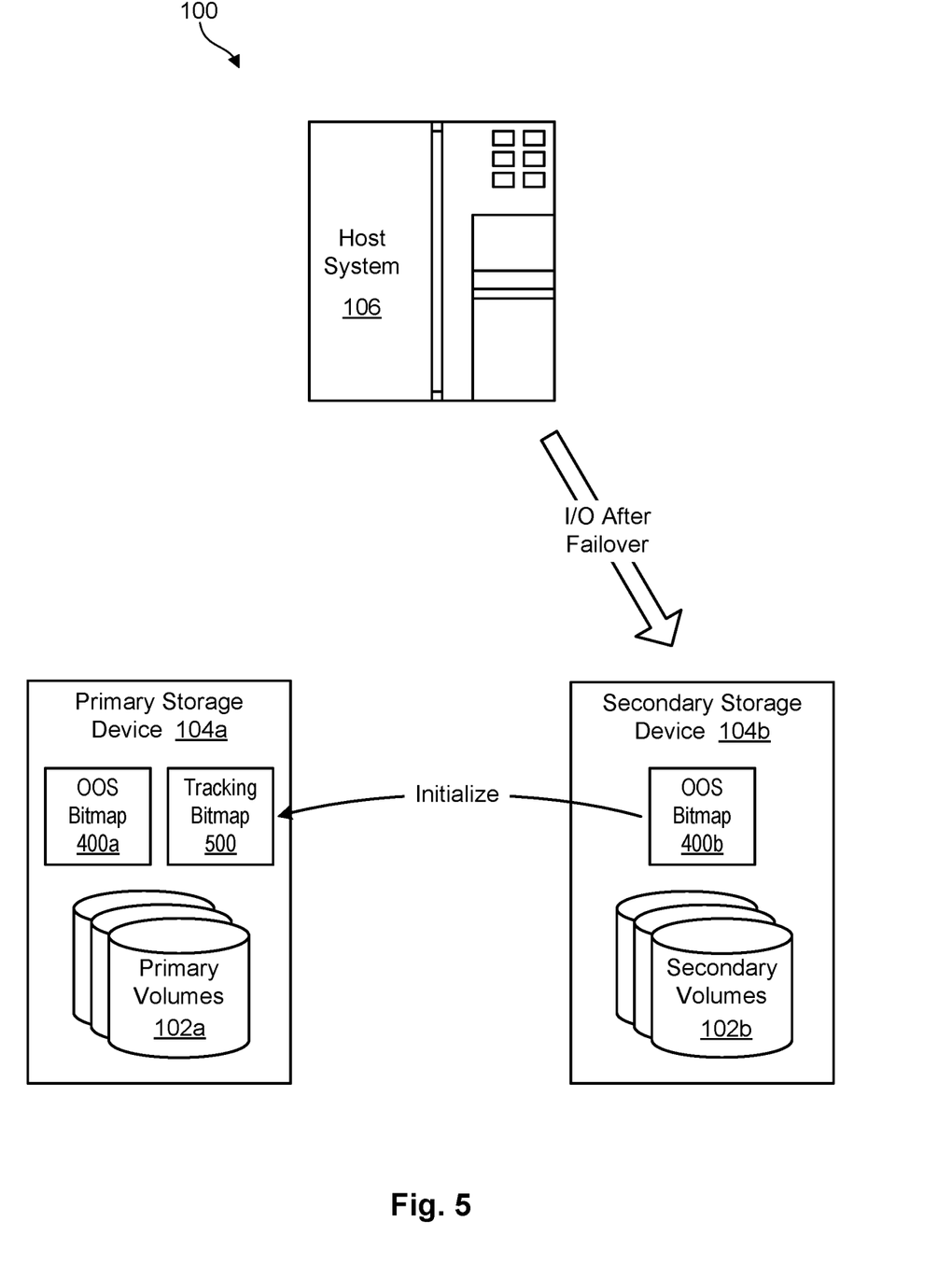
FIG. 5 is a high-level block diagram showing the creation of a tracking bitmap at the primary site and the initialization of the tracking bitmap to reflect data in the secondary out-of sync bitmap.

Referring to FIG. 5, after an outage has been corrected at the primary site, the primary volume 102a may need to be resynchronized with the secondary volume 102b so that it contains the most recent version of data. When this resynchronization process is initiated (in response to, for example, a resync command), a new tracking bitmap 500 may be created on the primary storage device 104a. Like the primary out-of-sync bitmap 400a, this tracking bitmap 500 may include a bit for each storage element in the primary volume 102a. In certain embodiments, the tracking bitmap 500 may be initialized with data in the secondary out-of-sync bitmap 400b. Thus, the tracking bitmap 500 may contain information indicating which storage elements on the secondary volume 102b were updated but not yet copied to the primary volume 102a.

Figure 6:
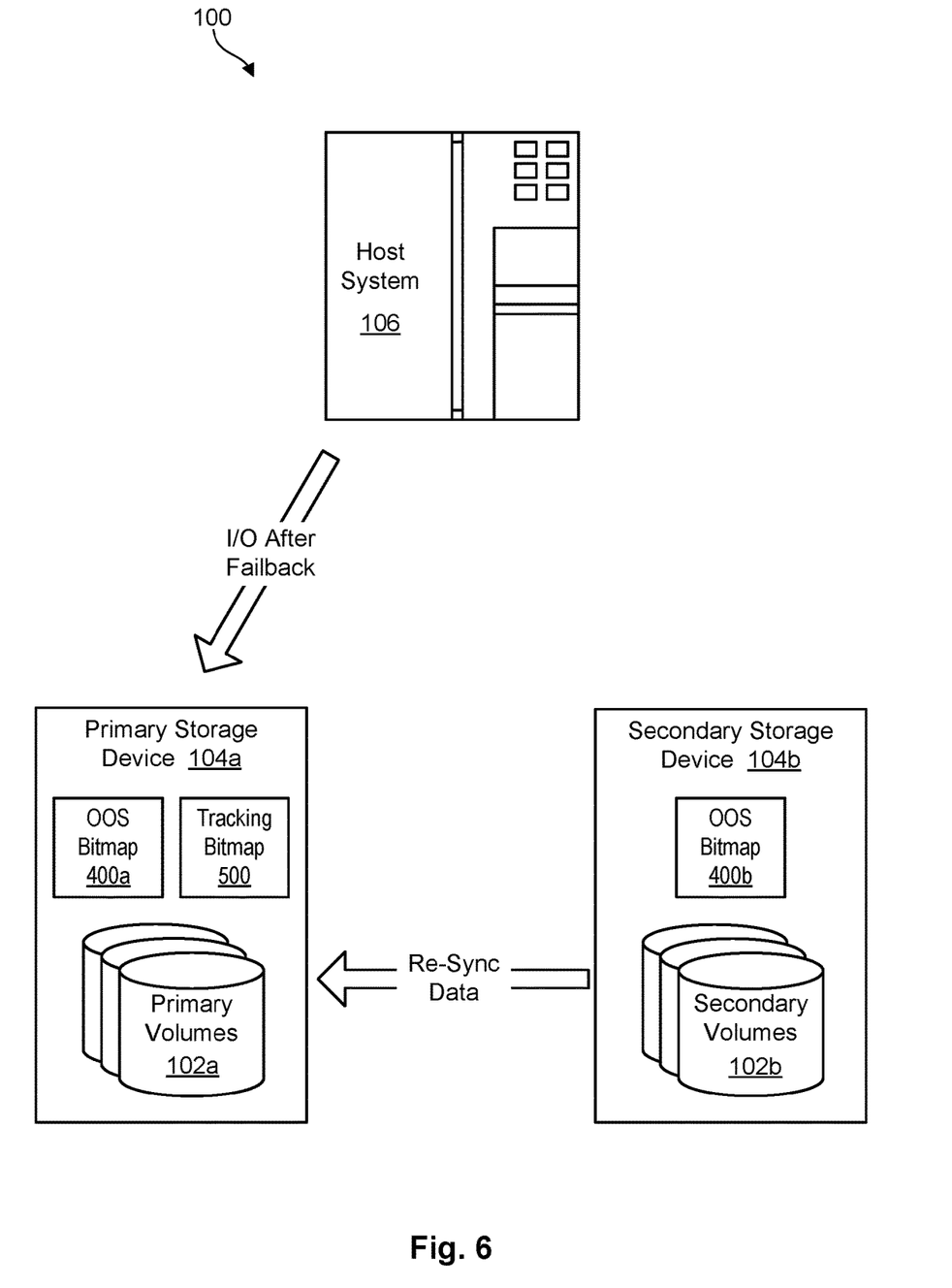
FIG. 6 is a high-level block diagram showing the resumption of I/O to the primary storage device while the primary storage device is being re-synchronized with the secondary storage device.

Referring to FIG. 6, once the tracking bitmap 500 has been created and initialized, production may resume to the primary volume 102a, even if the primary volume 102a has not been fully re-synchronized with the secondary volume 102b. That is, I/O may resume to the primary volume 102a before it has been fully updated with data from the secondary volume 102b. This represents a significant advance in the art and allows production to be resumed at a primary site in an accelerated manner. Using the tracking bitmap 500, I/O may be redirected to the primary volume 102a while the primary volume 102a is being resynchronized with the secondary volume 102b.

After production has resumed at the primary site, the tracking bitmap 500 may be used keep track of writes to the primary volume 102a. When a host system 106 writes to a storage element in the primary volume 102a, this storage element will contain the most recent copy of the data. Thus, this data no longer needs to be copied from the secondary volume 102b to the primary volume 102a. Thus, when a host system 106 writes data to the primary volume 102a, the corresponding bit(s) in the tracking bitmap 500 may be reset to indicate that this data not longer needs to be copied from the secondary volume 102b to the primary volume 102a. In the event this data is nevertheless received from the secondary volume 102b, the data may be rejected since the primary volume 102a already has the most recent version of the data. In certain embodiments, the primary storage device 104a may return an indicator (e.g., a reason code, etc.) to the secondary storage device 104b indicating that the data is no longer needed so that the secondary storage device 104b can reset the corresponding bit(s) in the secondary out-of-sync bitmap 400b. The primary storage device 104a may also set the corresponding bit(s) in the primary out-of-sync bitmap 400a, thereby indicating that data in the corresponding storage elements needs to be copied from the primary volume 102a to the secondary volume 102b.

After production has resumed at the primary site, updates made to the secondary volume 102b during the outage may be mirrored back to the primary volume 102a. When updates are received by the primary volume 102a from the secondary volume 102b, the primary storage device 104a may reset the corresponding bit(s) in the tracking bitmap 500 to indicate that the most recent version of the data is stored on the primary volume 102a. The primary storage device 104a may also return an acknowledgement to the secondary storage device 104b indicating that the updates have been written to the primary volume 102a. This allows the secondary storage device 104b to reset the corresponding bit(s) in the secondary out-of-sync bitmap 400b, thereby preventing the storage elements from being copied again.

Figure 7:
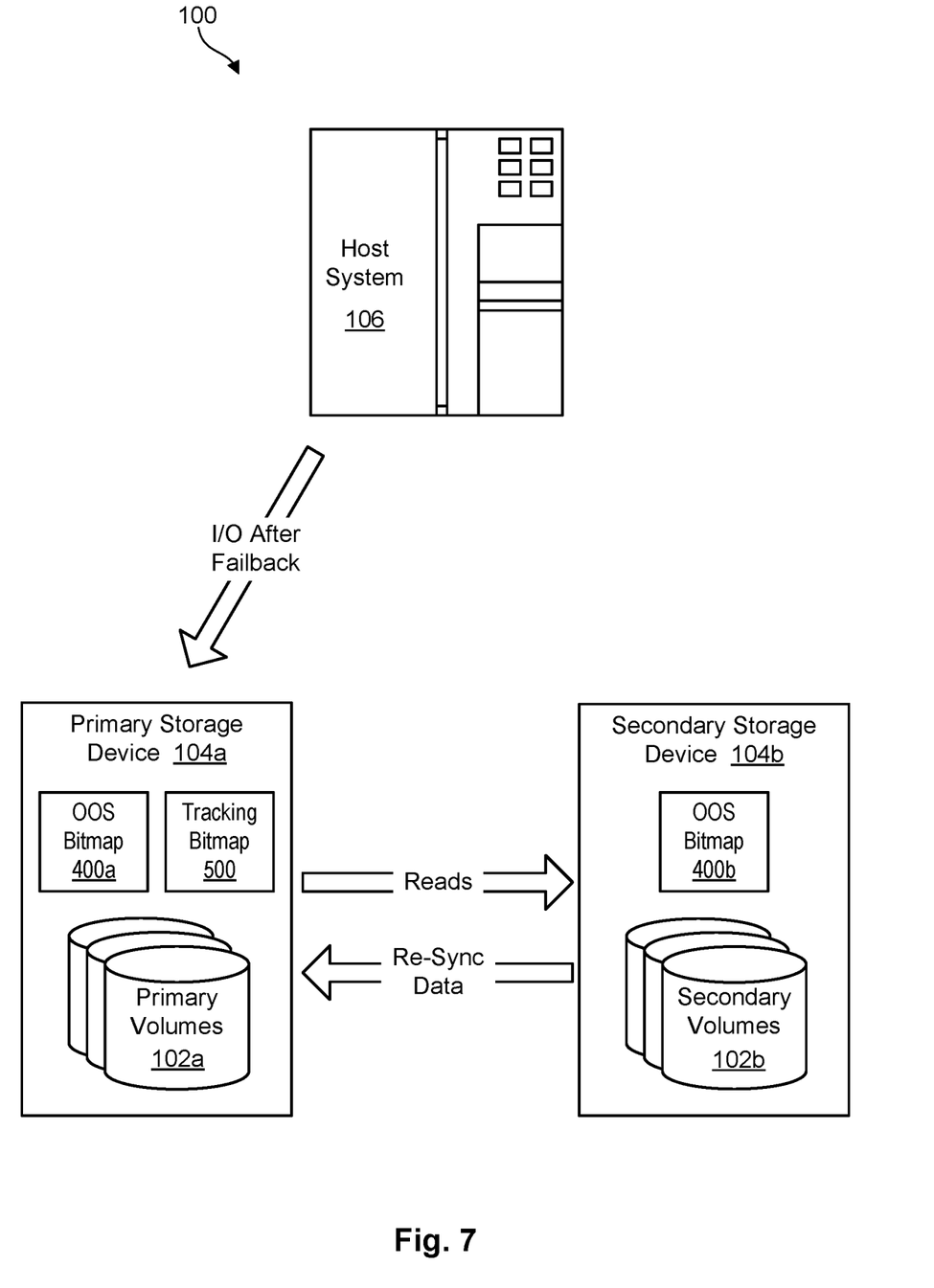
FIG. 7 is a high-level block diagram showing the redirection of some reads from the primary storage device to the secondary storage device during the re-synchronization process.

Referring to FIG. 7, when a host system 106 attempts to read data on the primary volume 102a, the primary storage device 104a may check the tracking bitmap 500 to determine if the most recent copy of the data is stored in the primary volume 102a, or if the data still resides solely on the secondary volume 102b. If the most recent data is not in the primary volume 102a, the primary storage device 104a may retrieve the most recent data from the secondary volume 102b and return this data to the host system 106. At this time, the data may also be written to the primary volume 102a and the corresponding bit(s) may be reset in the tracking bitmap 500 to indicate that the primary volume 102a stores the most recent copy of the data. In this way, reads may be processed before the primary volume 102a is fully re-synchronized with the secondary volume 102b.

Figure 8:
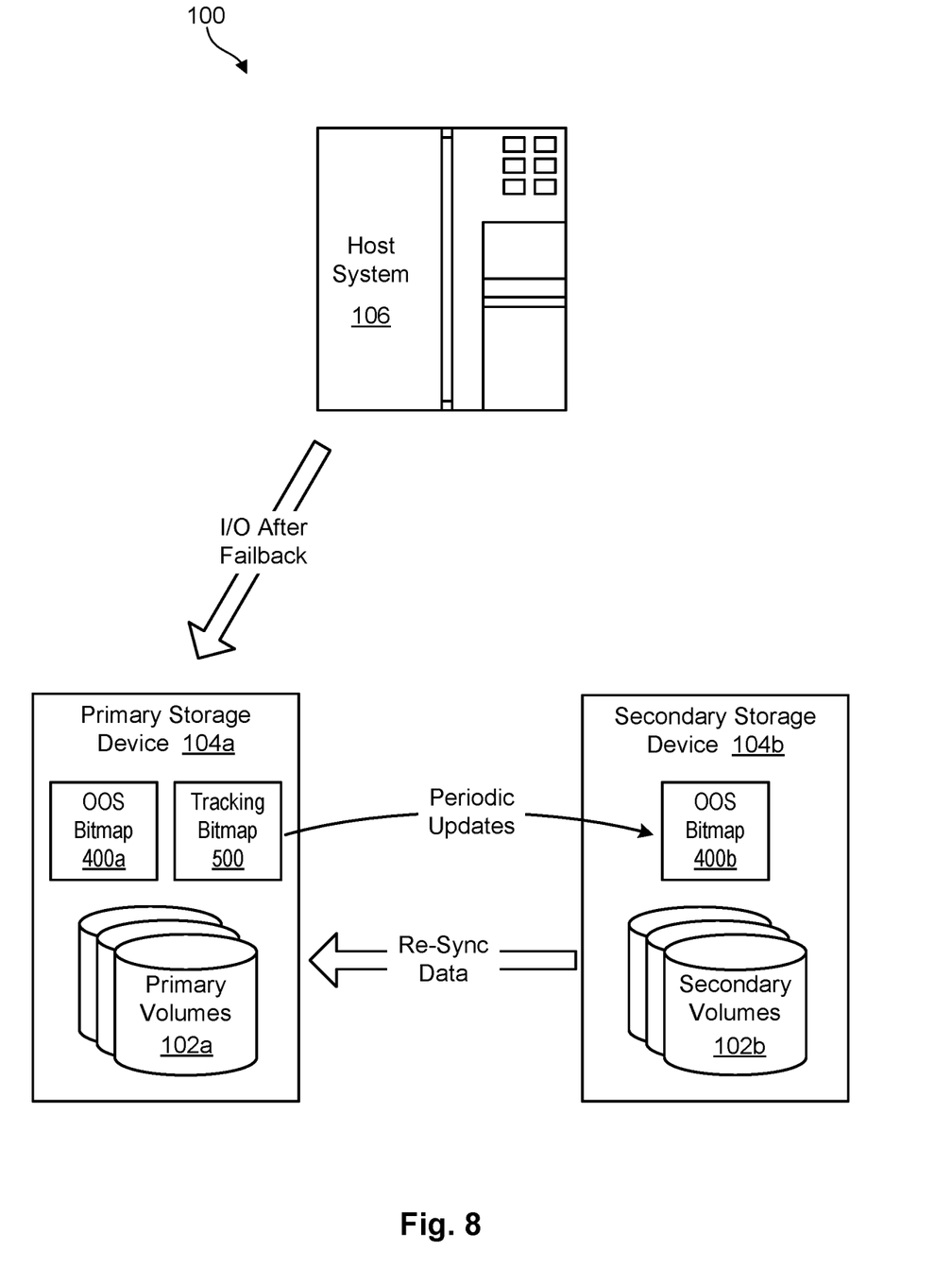
FIG. 8 is a high-level block diagram showing periodically transmitting the tracking bitmap from the primary storage device to the secondary storage device to update the secondary out-of sync bitmap.

Referring to FIG. 8, as the primary volume 102a receives writes from the host system 106 and these writes are recorded in the tracking bitmap 500, the tracking bitmap 500 may become less synchronized with the secondary out-of-sync bitmap 400b. That is, the secondary out-of-sync bitmap 400b may indicate that certain data needs to be copied when in fact the primary volume 102a already contains the most recent version of the data. In such cases, the data on the secondary volume 102b no longer needs to be copied to the primary volume 102a. To synchronize the tracking bitmap 500 and secondary out-of-sync bitmap 400b, the tracking bitmap 500 may, in certain embodiments, be periodically transmitted from the primary storage device 104a to the secondary storage device 104b in order to update the secondary out-of-sync bitmap 400b. Upon receiving the tracking bitmap 500, the secondary storage device 104b may, in certain embodiments, update the secondary out-of-sync bitmap 400b by performing an AND operation between the tracking bitmap 500 and the secondary out-of-sync bitmap 400b. Updating the secondary out-of-sync bitmap 400b will reduce the amount of data that is unnecessarily sent from the secondary storage device 104b to the primary storage device 104a, thereby preserving bandwidth.

In other embodiments, instead of periodically sending the entire tracking bitmap 500 to the secondary storage device 104b, the primary storage device 104a may send a message to the secondary storage device 104b each time the host system 106 writes data to the primary volume 102a. This will enable the secondary storage device 104b to update the secondary out-of-sync bitmap 400b accordingly.

Figure 9:
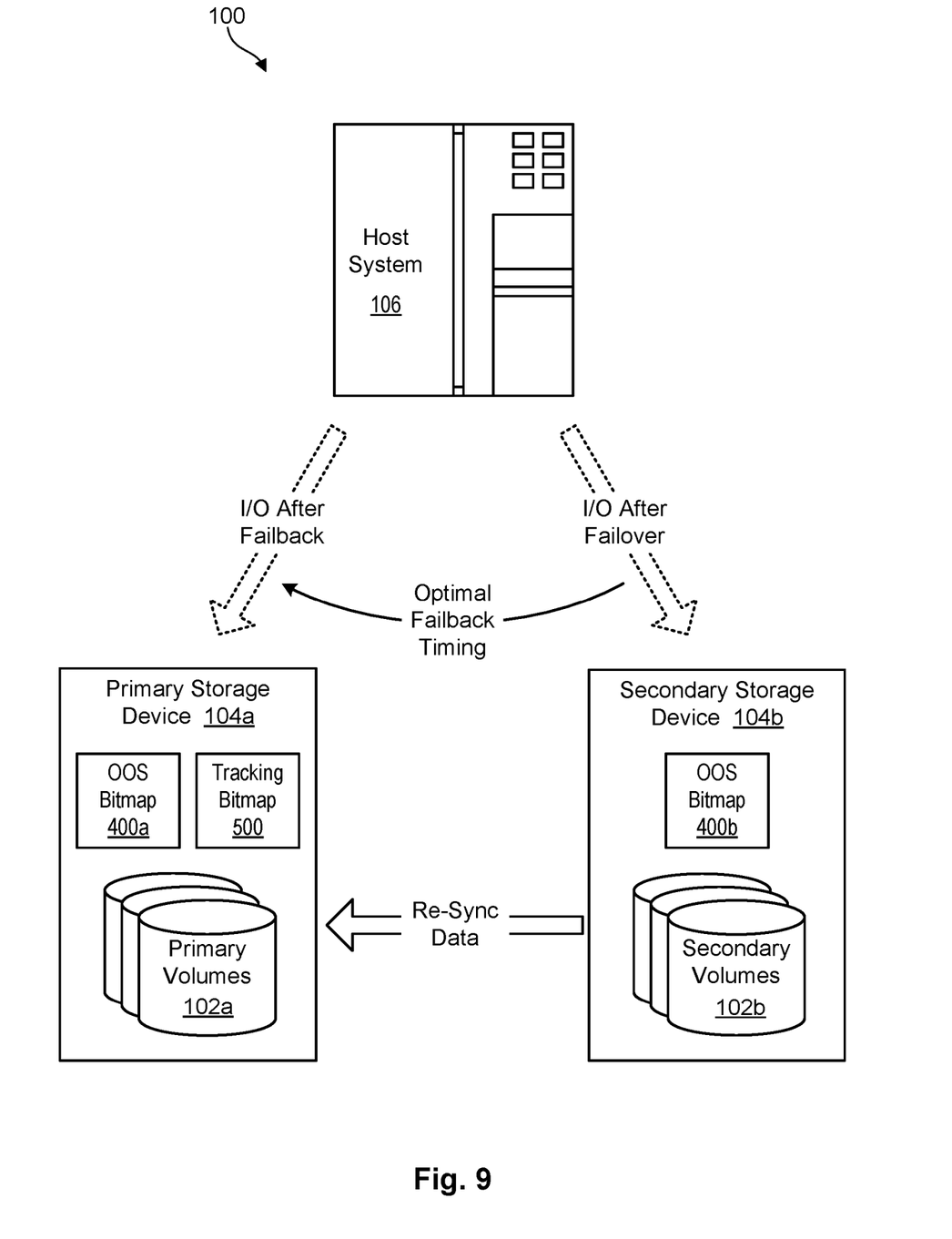
FIG. 9 is a high-level block diagram showing optimal timing for failing back from a secondary site to a primary site.

Referring to FIG. 9, in certain environments, after an outage has been corrected at the primary site, production may, in certain embodiments, be resumed at the primary site at a time and in a manner that optimally utilizes bandwidth and minimizes I/O latency. If I/O is driven to the secondary storage device 104b during the recovery process (i.e., when the primary storage device 104a is being resynchronized with data from the secondary storage device 104b), a bandwidth hit may occur every time a storage element (e.g., track) that was already transferred to the primary storage device 104a is written to the secondary storage device 104b. This will require the storage element to be transferred to the primary storage device 104a twice, and possibly more than twice if the storage element receives additional writes.

Similarly, if I/O is driven to the primary storage device 104a during the recovery process, a bandwidth (and latency) hit may occur every time a storage element (e.g., track) that hasn't already been transferred to the primary storage device 104a needs to be retrieved from the secondary storage device 104b. In certain embodiments, systems and methods in accordance with the invention may consider both bandwidth and latency issues when deciding an optimal time to resume I/O at a primary storage device 104a after the recovery process has started. In most cases, the optimal time will occur after the resynchronization process has started but before the primary storage device 104a is fully resynchronized with updated data from the secondary storage device 104b.

Figure 10:
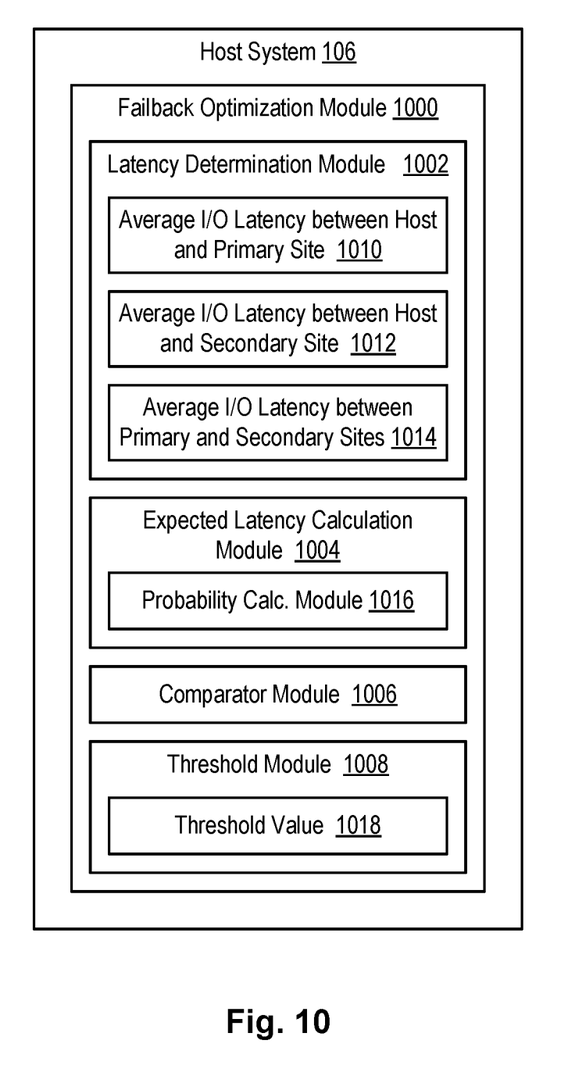
FIG. 10 is a high-level block diagram showing various modules for optimally failing back from a secondary site to a primary site.

Referring to FIG. 10, in order to determine when to optimally resume production at a primary storage device 104a, a failback optimization module 1000 may be provided in the host system 106 or another suitable location. The failback optimization module 1000 may be implemented in hardware, software, firmware, or a combination thereof. As shown, the failback optimization module 1000 may include various sub-modules to provide various features and functions. These sub-modules may include one or more of a latency determination module 1002, expected latency calculation module 1004, comparator module 1006, and threshold module 1008.

The latency determination module 1002 may determine various average latencies within a data replication system 100. For example, the latency determination module 1002 may determine an average I/O latency 1010 between a host system 106 and a primary site; an average I/O latency 1012 between a host system 106 and a secondary site; and/or an average I/O latency 1014 between a primary site and a secondary site. In certain embodiments, these average I/O latencies may be determined from metrics maintained by hierarchical storage management software (e.g., EZ Tier®) or other applications on the host system 106 or other systems. In other embodiments, the latency determination module 1002 may monitor real I/O between the host system 106 and primary storage device 104a, host system 106 and secondary storage device 104b, and primary storage device 104a and secondary storage device 104b, to determines I/O latencies therebetween. In yet other embodiments, the latency determination module 1002 may generate test I/Os between the host system 106 and primary storage device 104a, host system 106 and secondary storage device 104b, and primary storage device 104a and secondary storage device 104b, to determine the I/O latencies. In certain embodiments, several of the above-described techniques may be used in combination to determine average I/O latencies.

The expected latency calculation module 1004 may be configured to determine an expected average I/O latency between the host system 106 and the primary storage device 104a during the recovery process (assuming I/O is redirected to the primary storage device 104a). The expected average I/O latency may change depending on how far the resynchronization process has progressed. Thus, the expected latency calculation module 1004 may repeatedly recalculate the expected average I/O latency as the recovery process progresses. In order to calculate the expected average I/O latency, a probability calculation module 1016 may calculate a probability that a read to the primary storage device 104a will require retrieving data from the secondary storage device 104b, and a probability that a read to the primary storage device 104a will not require retrieving data from the secondary storage device 104b (i.e., the requested data is already on the primary storage device 104a). These probabilities, which may be used in the calculation of the expected average I/O latency, will change as the recovery process progresses.

In one embodiment, the expected latency calculation module 1004 calculates the expected average I/O latency as follows:

(probability that a read to the primary storage device 104a will require retrieving data from the secondary storage device 104b)*((average I/O latency 1010 between the host system 106 and the primary site)+(average I/O latency 1014 between the primary site and the secondary site))+(probability that a read to the primary storage device 104a will not require retrieving data from the secondary storage device 104b)*(average I/O latency 1010 between the host system 106 and the primary site)

As the recovery process progresses and the expected average I/O latency changes, the comparator module 1006 may compare the expected average I/O latency with the average I/O latency 1012 between the host system 106 and the secondary site. When the difference between the expected average I/O latency and the average I/O latency 1012 reaches a threshold value 1018 (e.g., zero, such that the average I/O latency 1012 is greater than or equal to the expected average I/O latency), the threshold module 1008 may cause production to be resumed at the primary site (i.e., cause I/O to be redirected from the secondary site to the primary site). In certain embodiments, the threshold value 1018 may be set to ensure that the average I/O latency after resuming production at the primary site (which includes the penalties of reads for storage elements not yet copied to the primary site) does not exceed the average I/O latency when I/O is driven to the secondary site. This ensures optimal bandwidth utilization during the recovery process, as it ideally avoids having to copy a storage element to the primary site more than once due to writes to the storage element at the secondary site after the data is transferred.

Figure 11:
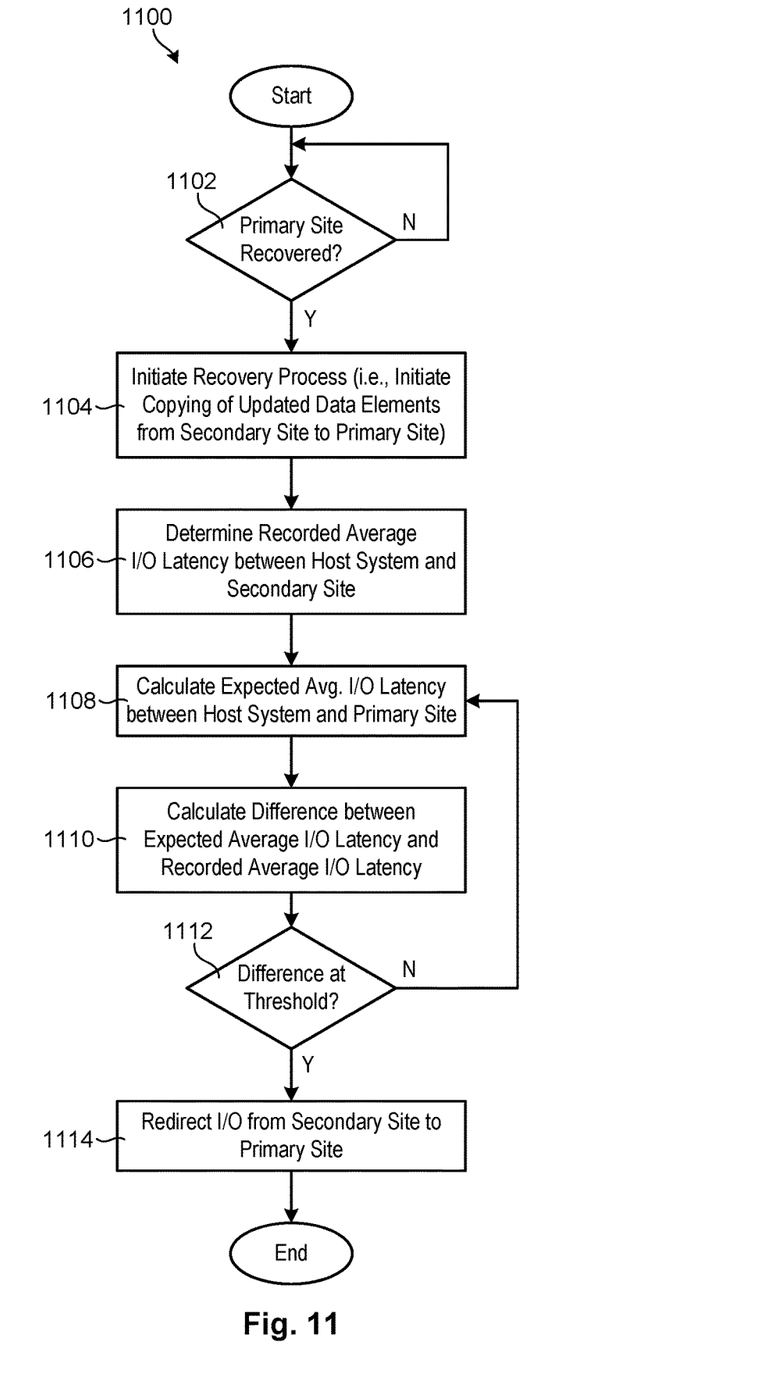
FIG. 11 is a process flow diagram showing one embodiment of a method for optimally failing back from a secondary site to a primary site.

Referring to FIG. 11, one embodiment of a method 1100 for optimally failing back from a secondary site to a primary site is illustrated. As shown, the method 1100 initially determines 1102 whether a primary site has recovered (i.e., the primary storage device 104a is once again operational). If the primary site has recovered, the method 1100 initiates 1104 a recovery process wherein updated storage elements at the secondary site are copied to the primary site. The method 1100 also determines 1106 a recorded average I/O latency between the host system 106 and the secondary site. The method 1100 also calculates 1108 an expected average I/O latency between the host system 106 and the primary site, as was previously explained.

The method 1100 then calculates 1110 a difference between the expected average I/O latency and the recorded average I/O latency and determines 1112 whether the difference has reached a threshold value 1018 (e.g., zero). If the difference has reached a threshold value 1018, the method 1100 redirects I/O from the secondary site to the primary site and the method 1100 ends. If the difference has not reached the threshold value 1018, the method 1100 recalculates 1108 the expected average I/O latency (since this value will change during the recovery process) and recalculates 1110 the difference between the expected average I/O latency and the recorded average I/O latency. This process continues until the difference reaches the threshold value 1018. Once the threshold value 1018 is reached, the method 1100 redirects I/O from the secondary site to the primary site and the method 1100 ends.

Although the systems and methods disclosed herein have been discussed primarily in association with PPRC and XRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for optimizing recovery in a data replication environment, the method comprising:
   directing I/O from a primary site to a secondary site in response to a failure at the primary site;
   after the primary site has recovered from the failure, initiating a recovery process wherein updated data elements at the secondary site are copied to the primary site;
   determining a recorded average I/O latency for a host system driving I/O to the secondary site;

calculating an expected average I/O latency for the host system driving I/O to the primary site; and redirecting I/O from the secondary site to the primary site when a difference between the expected average I/O latency and the recorded average I/O latency reaches a threshold value.

2. The method of claim 1, wherein the threshold value is zero.

3. The method of claim 1, further comprising determining a first probability that a read to the primary site will require retrieving data from the secondary site, and a second probability that a read to the primary site will not require retrieving data from the secondary site.

4. The method of claim 3, further comprising calculating a first latency component by multiplying the first probability by the sum of: (1) an average I/O latency between the host system and the primary site; and (2) an average I/O latency between the primary site and the secondary site.

5. The method of claim 4, further comprising calculating a second latency component by multiplying the second probability by the average I/O latency from the host system to the primary site.

6. The method of claim 5, wherein calculating the expected average I/O latency comprises adding the first latency component to the second latency component.

7. The method of claim 1, wherein calculating the expected average I/O latency comprises repeatedly recalculating the expected average I/O latency during the recovery process.

8. A computer program product for optimizing recovery in a data replication environment, the computer program product comprising a computer-readable medium having computer-usable program code embodied therein, the computer-usable program code comprising:

computer-usable program code to direct I/O from a primary site to a secondary site in response to a failure at the primary site;

computer-usable program code to, after the primary site has recovered from the failure, initiate a recovery process wherein updated data elements at the secondary site are copied to the primary site;

computer-usable program code to calculate a recorded average I/O latency for a host system driving I/O to the secondary site;

computer-usable program code to calculate an expected average I/O latency for the host system driving I/O to the primary site; and computer-usable program code to redirect I/O from the secondary site to the primary site when a difference between the expected average I/O latency and the recorded average I/O latency reaches a threshold value.

9. The computer program product of claim 8, wherein the threshold value is zero.

10. The computer program product of claim 8, further comprising computer-usable program code to determine a first probability that a read to the primary site will require retrieving data from the secondary site, and a second probability that a read to the primary site will not require retrieving data from the secondary site.

11. The computer program product of claim 10, further comprising computer-usable program code to calculate a first latency component by multiplying the first probability by the sum of: (1) an average I/O latency between the host system and the primary site; and (2) an average I/O latency between the primary site and the secondary site.

12. The computer program product of claim 11, further comprising computer-usable program code to calculate a second latency component by multiplying the second probability by the average I/O latency from the host system to the primary site.

13. The computer program product of claim 12, wherein calculating the expected average I/O latency comprises adding the first latency component to the second latency component.

14. The computer program product of claim 8, wherein calculating the expected average I/O latency comprises repeatedly recalculating the expected average I/O latency during the recovery process.

15. A system for optimizing recovery in a data replication environment, the system comprising:

at least one processor;

at least one memory device coupled to the at least one processor and storing instructions for execution on the at least one processor, the instructions causing the at least one processor to:

direct I/O from a primary site to a secondary site in response to a failure at the primary site;

after the primary site has recovered from the failure, initiate a recovery process wherein updated data elements at the secondary site are copied to the primary site;

calculate a recorded average I/O latency for a host system driving I/O to the secondary site;

calculate an expected average I/O latency for the host system driving I/O to the primary site; and redirect I/O from the secondary site to the primary site when a difference between the expected average I/O latency and the recorded average I/O latency reaches a threshold value.

16. The system of claim 15, wherein the threshold value is zero.

17. The system of claim 15, wherein the instructions further cause the at least one processor to determine a first probability that a read to the primary site will require retrieving data from the secondary site, and a second probability that a read to the primary site will not require retrieving data from the secondary site.

18. The system of claim 17, wherein the instructions further cause the at least one processor to calculate a first latency component by multiplying the first probability by the sum of: (1) an average I/O latency between the host system and the primary site; and (2) an average I/O latency between the primary site and the secondary site.

19. The system of claim 18, wherein the instructions further cause the at least one processor to calculate a second latency component by multiplying the second probability by the average I/O latency from the host system to the primary site.

20. The system of claim 19, wherein calculating the expected average I/O latency comprises adding the first latency component to the second latency component.

* * * * *